United States Patent [19]

Quintens et al.

[11] Patent Number: 5,354,613
[45] Date of Patent: Oct. 11, 1994

[54] ANTISTACTIC COATING ON HYDROPHOBIC RESIN OR PAPER SUPPORT

[75] Inventors: Dirk Quintens, Lier; Bavo Muys, Mortsel; Etienne Van Thillo, Essen; Rafaël Samijn, Wilrijk, all of Belgium

[73] Assignee: AGFA-GEVAERT, N.V., Mortsel, Belgium

[21] Appl. No.: 130,466

[22] Filed: Oct. 1, 1993

[30] Foreign Application Priority Data

Oct. 14, 1992 [EP] European Pat. Off. ........ 92203149.7

[51] Int. Cl.$^5$ .......................... B32B 5/16; G03C 1/76
[52] U.S. Cl. .................................. 428/341; 428/423.1; 428/423.7; 428/419; 428/481; 428/483; 428/511; 428/514; 428/475.2; 428/522
[58] Field of Search ............... 428/341, 419, 481, 483, 428/511, 514, 922, 423.7, 423.1, 475.2, 522

[56] References Cited

U.S. PATENT DOCUMENTS 5,008,178  4/1991  Van Thillo ......................... 430/527
5,300,575  4/1994  Jonas et al. ......................... 525/186

*Primary Examiner*—P. C. Sluby
*Attorney, Agent, or Firm*—Breiner & Breiner

[57] ABSTRACT

A sheet or web material comprising a hydrophobic resin support or paper support coated with at least one hydrophobic resin layer which is coated with an outermost antistatic layer which contains as an essential antistatic component a polythiophene with conjugated polymer backbone in the presence of a polymeric polyanion compound, wherein the layer also contains a dispersion of a hydrophobic polymer which polymer has a glass transition temperature (Tg) of at least 40° C. and the layer is a coherent layer.

11 Claims, No Drawings

ANTISTACTIC COATING ON HYDROPHOBIC RESIN OR PAPER SUPPORT

DESCRIPTION

1. Field of the Invention

The present invention relates to a sheet or web material having antistatic properties, and is particularly but not exclusively concerned with a recording material wherein a water resistant or hydrophobic resin support carries an outermost antistatic layer.

2. Background of the Invention

It is known that hydrophobic resin sheet and web materials of low conductivity readily become electrostatically charged by friction with dielectric materials and/or contact with electrostatically chargeable transport means, e.g. rollers. The charging occurs particularly easily in a relatively dry atmospheric environment.

Sheets and webs of hydrophobic resins, e.g. polyesters or cellulosetriacetate, are commonly used as support element of recording materials. Such materials come in contact with other elements causing electrostatic charging by friction during their manufacture, e.g. during coating or cutting, during the recording of information, e.g. with a step-and-repeat or movie camera or during image-processing and image projection.

Especially in the reeling-up or unfeeling of dry photographic film in a camera or projector high friction may occur, resulting in electrostatic charges that may attract dust or cause sparking. In unprocessed photographic silver halide emulsion materials sparking causes developable fog and degrades the image quality.

In order to reduce electrostatic charging of photographic sheet or web materials comprising a hydrophobic resin support coated with at least one silver halide emulsion layer without impairing their transparency it is known to incorporate ionic compounds in these materials, e.g. in the gelatin-silver halide emulsion layer(s) or other hydrophilic colloid layers. In order to avoid diffusion of ionic compounds out of said layers during the wet processing treatments of said materials, preference has been given to incorporate therein antistatic high molecular weight polymeric compounds having ionic groups, e.g. carboxylic sodium salt groups, at frequent intervals in the polymer chain [ref. Photographic Emulsion Chemistry, by G. F. Duffin,—The Focal Press—London and New York (1966)—Focal Press Ltd., p. 168].

The conductivity of an antistatic layer containing said ionic conductive polymers is moisture dependent and is lowered considerably by treatment with an acidic photographic processing liquid, e.g. an acidic photographic fixing liquid or stop bath.

Relatively recently electrically-conducting conjugated polymers have been developed that have electronic conductivity. Representatives of such polymers are described in the periodical Materials & Design Vol. 11, No. 3—June 1990, p. 142-152, and in the book "Science and Applications of Conducting Polymers"—Papers from the 6th European Physical Society Industrial Workshop held in Lothus, Norway, May 28-31, 1990, Edited by W. R. Salaneck Linkoping University, D. T. Clark ICI Wilton Materials Research Centre, and E. J. Samuelson University of Trondheim, published under the Adam Hilger imprint by IOP Publishing Ltd Techno House, Redcliffe Way, Bristol BS1 6NX, England.

Many of these conductive polymers are highly coloured which makes them less suited for use in photographic materials, but some of them of the group of the polyarenemethylidenes, e.g. polythiophenes and polyisothianaphthene are transparent and not prohibitively coloured, at least when coated in thin layers at moderate coverages.

Substances having electronic conductivity instead of ionic conductivity have a low electric resistivity independent from relative humidity whereby they are particularly suited for use in the production of antistatic layers with permanent and reproducible conductivity.

The production of conductive polythiophenes is described in preparation literature mentioned in the above mentioned book: "Science and Applications of Conducting Polymers", p. 92.

The production of colour neutral conducting polymers from isothionaphthene is described in J Electrochem Soc 134, (1987) 46.

For ecological reasons the coating of antistatic layers should proceed where possible from aqueous medium by using as less as possible of organic solvents. The production of antistatic coatings from aqueous dispersions of polythiophenes in the presence of polyanions is described in published European patent application 0 440 957 and corresponding U.S. Ser. No. 647,093, now U.S. Pat. No. 5,300,575, which should be read in conjunction herewith.

It has been established experimentally that these coatings are easily damaged mechanically and therefore need the overcoating with a protection layer. Suitable protection layers may be applied from a solution in organic solvent of film-forming "hard" organic resins such as poly(methyl methacrylate).

Such layer system requires a two-stage coating and the application of each layer from different coating media in which the coating stage involving the use of organic solvent(s) for ecological and economic reasons needs the recovery of the organic solvent(s). It would therefore be desirable to dispose of an antistatic coating that itself without additional protective coating could withstand mechanical damage and could be coated from aqueous medium optionally in the presence of minor amounts of organic solvents.

3. Objects and Summary of the Invention

It is an object of the present invention to provide an aqueous coating composition for the production of an antistatic outermost coating or layer on electrically insulating materials such as water resistant resin materials, e.g. fibers, yarn, sheets, panels, webs, molded objects and etc., whereto said coating or layer provides an almost moisture independent conductivity, associated with good adherence to its substrate and mechanical strength offering high resistance against wear without the necessity of an additionally coated protective layer.

It is a further object of the present invention to provide a recording material having a recording layer, e.g. photographic gelatin-silver halide emulsion layer, coated on a resin sheet or web support wherein said recording material through an outermost antistatic layer on said support obtains permanent antistatic properties, i.e. does not show a substantial change in resistivity after having been subjected to wet. processing, and wherein said antistatic layer does not stick to an outermost hydrophilic colloid layer such as a silver halide emulsion layer when a web of said material containing said outermost hydrophilic colloid layer at the side of the support-opposite to the side coated with said antistatic layer is rolled up.

Other objects and advantages of the present invention will become clear from the further description and examples.

According to the present invention there is provided an aqueous coating composition suited for the production of an antistatic layer on a water resistant resin member which composition contains as an essential antistatic component a polythiophene with conjugated polymer backbone in the presence of a polymeric polyanion compound, characterized in that said composition also contains a dispersion of a hydrophobic organic polymer having a glass transition temperature (Tg) of at least 40° C., said composition forming a coherent layer on drying the dispersion.

In said aqueous coating composition the weight ratio of said polythiophene to said hydrophobic organic polymer is preferably in the range of 1/10 to 1/1000, and more preferably in the range of 1/20 to 1/100.

Further according to the present invention there is provided a sheet or web material comprising a water resistant resin support or paper support coated with at least one water resistant resin layer wherein said resin support or resin layer is coated with an outermost antistatic layer containing as an essential component a polythiophene with conjugated polymer backbone in the presence of a polymeric polyanion compound, characterized in that said antistatic layer contains also a hydrophobic organic polymer having a glass transition value (Tg) of at least 40° C., said polythiophene being present at a coverage of at least 0.001 g/m² and the weight ratio of said polythiophene to said hydrophobic organic polymer being in the range of 1/10 to 1/1000.

When used in photographic materials the antistatic layer contains said hydrophobic organic polymer preferably at a coverage in the range of 0.05 to 5.00 g/m².

4. Detailed Description of the Invention

A preferred polythiophene for use according to the present invention contains thiophene nuclei substituted with at least one alkoxy group, e.g. $C_1$-$C_{12}$ alkoxy group or —O(CH$_2$CH$_2$O)$_n$CH$_3$ group, n being 1 to 4, or the thiophene nucleus is ring closed over two oxygen atoms with an alkylene group including such group in substituted form.

Examples of preferred polythiophenes for use according to the present invention have structural units corresponding to the following general formula (I):

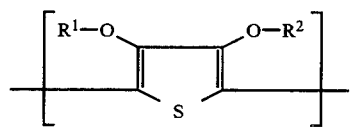

(I)

in which:
each of $R^1$ and $R^2$ independently represents hydrogen or a $C_{1-4}$ alkyl group or together represent an optionally substituted $C_{1-4}$ alkylene group, preferably an ethylene group, an optionally alkyl-substituted methylene group, an optionally $C_{1-12}$ alkyl- or phenyl-substituted 1,2-ethylene group, a 1,3-propylene group or a 1,2-cyclohexylene group.

The preparation of said polythiophene and of aqueous polythiophene-polymeric polyanion dispersions containing said polythiophene is described in published European patent application 0 440 957.

The preparation of said polythiophene proceeds in the presence of said polymeric polyanion compounds by oxidative polymerization of 3,4-dialkoxythiophenes or 3,4-alkylenedioxythiophenes according to the following general formula (II):

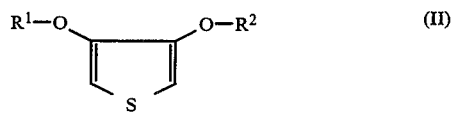

(II)

wherein:
$R^1$ and $R^2$ are as defined in general formula (I), with oxidizing agents typically used for the oxidative polymerization of pyrrole and/or with oxygen or air in the presence of said polacids, preferably in aqueous medium containing optionally a certain amount of organic solvents, at temperatures of 0° to 100° C.

The polythiophenes get positive charges by the oxidative polymerization, the location and number of said charges is not determinable with certainty and therefore they are not mentioned in the general formula of the repeating units of the polythiophene polymer.

When using air or oxygen as the oxidizing agent their introduction proceeds into a solution containing thiophene, polyacid, and optionally catalytic quantities of metal salts till the polymerization is complete.

Oxidizing agents suitable for the oxidative polymerization of pyrrole are described, for example, in J. Am. Soc. 85, 454 (1963). Inexpensive and easy-to-handle oxidizing agents are preferred such as iron(III) salts, e.g. $FeCl_3$, $Fe(ClO_4)_3$ and the iron(III) salts of organic acids and inorganic acids containing organic residues, likewise $H_2O_2$, $K_2Cr_2O_7$, alkali persulfate, preferably $K_2S_2O_8$, or ammonium persulfate, alkali perborates, potassium permanganate and copper salts such as copper tetrafluoroborate.

Theoretically, 2.25 equivalents of oxidizing agent per mol of thiophene are required for the oxidative polymerization thereof [ref. J. Polym. Sci. Part A, Polymer Chemistry, Vol. 26, p. 1287 (1988)]. In practice, however, the oxidizing agent is used in a certain excess, for example, in excess of 0.1 to 2 equivalents per mol of thiophene.

For the polymerization, the thiophenes corresponding to the above general formula (II) a polyacid and oxidizing agent are dissolved or emulsified in an organic solvent or preferably in water and the resulting solution or emulsion is stirred at the envisaged polymerization temperature until the polymerization reaction is completed. By that technique stable aqueous polythiophene dispersions are obtained having a solids content of 0.1 to 55% by weight and preferably of 0.5 to 10% by weight.

The term "dispersion" includes a macro-dispersion wherein the average particle size is larger than 100 nm as well as a "colloidal" dispersion wherein the particles have an average particle size ranging from polymer molecule size to the average particle size of polymer molecule conglomerates having an average particle size not larger than 100 nm.

The polymerization time may be between a few minutes and 30 hours, depending on the size of the batch, the polymerization temperature and the kind of oxidizing agent. The stability of the obtained polythiophene dispersion may be improved during and/or after the polymerization by the addition of dispersing agents, e.g.

anionic surface active agents such as dodecyl sulfonate, alkylaryl polyether sulfonates described in U.S. Pat. No. 3,525,621.

It has been established experimentally that the presence of residual persulfate is undesirable when optically clear antistatic layers have to be formed and that the adhesion in wet state to hydrophobic resin supports is impaired thereby. Therefore, following the polymerization process a desalting step is introduced. For example, by known procedures such as dialysis, elektrodialysis, ultrafiltration or treatment with basic or acidic ion exchange resins the persulfate and particularly potassium persulfate is removed.

Suitable polymeric polyanion compounds for use in the presence of said polythiophenes prepared by oxidative polymerization are acidic polymers in free acid or neutralized form. The acidic polymers are preferably polymeric carboxylic or sulphonic acids. Examples of such polymeric acids are: polymers containing repeating units selected from the group consisting of acrylic acid, methacrylic acid, maleic acid, sulfonated acrylate or methacrylate esters, vinyl sulfonic acid and styrene sulfonic acid or mixtures thereof. The anionic (acidic) polymers used in conjunction with the dispersed polythiophene polymer have preferably a content of anionic groups of more than 2% by weight to ensure sufficient stability of the dispersion. Suitable acidic polymers or corresponding salts are described e.g. in DE-A -25 41 230, DE-A-25 41 274, DE-A-28 35 856, EP-A-14 921, EP-A-69 671, EP-A-130 115, U.S. Pat. Nos. 4,147,550, 4,388,403 and 5,006,451.

The polymeric polyanion compounds may consist of straight-chain, branched chain or crosslinked polymers. Cross-linked polymeric polyanion compounds with a high amount of acidic groups are swellable in water and are named microgels. Such microgels are disclosed e.g. in U.S. Pat. Nos. 4,301,240, 4,677,050 and 4,147,550.

The molecular weight of the polymeric polyanion compounds being polyacids is preferably in the range from 1,000 to 2,000,000 and more preferably in the range from 2,000 to 500,000. Polyacids within the above criteria are commercially available, for example polystyrene sulfonic acids and polyacrylic acids, or may be produced by known methods (ref. e.g. Houben-Weyl, Methoden der Organischen Chemie, Vol. E20, Makromolekulare Stoffe, Teil 2, (1987), pp. 141 et seq.).

Instead of the free polymeric polyacids applied in conjunction with the polythiophenes it is possible to use mixtures of alkali salts of said polyacids and non-neutralized polyacids, optionally in the presence of monoacids. Free acid groups of the polyanionic polymer may be allowed to react with an inorganic base, e.g. with sodium hydroxide, to obtain a neutral polymer dispersion before coating.

The weight ratio of polythiophene polymer to polymeric polyanion compound(s) can vary widely, for example from about 50/50 to 15/85.

The essential component of the outermost antistatic layer for providing the desired mechanical strength and adherence to an underlying hydrophobic resin support is the already mentioned hydrophobic dispersed polymer having a glass transition temperature (Tg) of at least 40° C.

Suitable hydrophobic organic polymers used in dispersed form (latex form) in the coating composition according to the present invention are homopolymers or copolymers made of polymerizable monomers selected from the group consisting of styrene, vinylidene chloride, vinyl chloride, alkyl acrylates, e.g. ethyl acrylate, and alkyl methacrylates, preferably methyl methacrylate. Further are mentioned polyesters and copolyesters, urethane acrylates, acrylamide or polyethers including mixtures thereof, with the proviso that the hydrophobic polymer has a Tg of at least 40° C.

A preferably used hydrophobic polymer is poly(methyl methacrylate) having a Tg value above 100° C. According to D. H. Solomon "The Chemistry of Organic Film Formers"—John Wiley & Sons, Inc. New York (1967), p. 27 the Tg value of poly(methyl methacrylate) is 105° C. Said Tg value relates to atactic and syndiotactic poly(methyl methacrylate) as can be learned from Polymer Handbook, 3th ed. by J. Brandrup and E. H. Immergut, John Wiley & Sons New York (1989), p. VI 219. The measurement of the Tg value of the hydrophobic polymers applied in the present Examples proceeded as described in European Patent Specification 0 078 559.

In order to obtain a stable uniformly coatable dispersion the coating composition according to the present invention contains a dispersing agent being a surface-active agent. A survey of surface-active agents also called surfactants is given e.g. in Tensid-Taschenbuch Herausgegeben von Dr. Helmut Stache—Carl Hanser Verlag München Wien (1979). Surfactants are classified as anionic, nonionic, cationic, and amphoteric surfactants.

Particularly suitable for use in the coating composition according to the present invention are anionic surfactants including a polyglycolether sulfate group.

The coherence of the antistatic layer and film-forming capability is improved by the presence in the coating composition according to the present invention of at least one organic liquid being a solvent or swelling agent for said hydrophobic polymer.

According to a preferred embodiment said organic solvent(s) or swelling agent(s) for the hydrophobic latex polymer are present in an amount of at least 50% by weight thereto.

Said organic solvent or swelling agent has preferably a boiling point above 100° C. Particularly useful are highly polar watermiscible solvents such as N-methyl-2-pyrrolidinone, N,N-dimethylformamide, dimethylsulfoxide, furfural, acetonitrile, propylene carbonate, and tetrahydrothiophene-1,1-dioxide (sulfolane). Said solvents are described in German Offenlegungsschrift 3717668 as solvents for alkoxy-or alkyleneoxy-substituted thiophene polymers. Other suitable solvents or swelling agents are: glycols, more particularly ethyleneglycol monomethylether, methyl glycolacetate, diethyleneglycol monoethylether, propyleneglycol n-butyl ether and ester-alcohol compounds such as trimethyl pentanediol monoisobutyrate. Most preferred are N-methyl-2-pyrrolidinone, N,N-dimethylformamide and ethyleneglycol monomethylether.

The coating composition of said outermost layer may contain also matting agents and/or frictions lowering substances, e.g. $TiO_2$ particles, colloidal silica, hydrophobized starch particles, fluor-substituted organic surface active agents (i.e. so-called fluortensides), wax particles and/or silicon resins and as spacing agents from the antistatic layer protruding polymer particles as described e.g. in U.S. Pat. No. 4,059,768 and in U.S. Pat. No. 4,614,708.

In a particular embodiment the outermost antistatic layer has anti-reflection properties and serves also as an antihalation layer by the presence of one or more pigments having light-absorbing properties, e.g. carbon black having itself antistatic properties.

The antistatic layer coating composition may be applied by any thin film-forming coating technique known in the art. In the coating of web type supports for photographic materials slide hopper coating is used advantageously, but other coating techniques such as dip coating and air knife coating may be used. For details about said coating techniques reference is made to "Modern Coating and Drying Technology" by Edward D. Cohen and Edgar B. Gutoff, published by VCH Publishers, Inc. 220 East 23rd Street, Suite 909 New York, N.Y. 10010.

Before applying the antistatic coating to the water resistant resin support material the resin sheet or web material may be pretreated or subbed to improve bonding, e.g. is subjected to a corona-discharge and/or attack by solvent(s) providing a micro-roughening.

Although the present antistatic coating composition is particularly suited for providing an antistatic layer to polyethylene terephthalate film supports, other resin supports known in the art may be coated thereby, e.g. polycarbonate, polystyrene, polymethacrylic acid ester and corona and flame treated polypropylene supports.

According to particular embodiments the coating and drying of the antistatic layer composition may proceed before longitudinal stretching or between longitudinal and transversal stretching of a polyethylene terephthalate film web, wherein the stretching in transverse direction may be e.g. at a draw ratio of 2.5:1 to 4.0:1. When stretched the antistatic layer composition may contain stretch-improving agents as described e.g. in U.S. Pat. No. 4,089,997.

On drying the antistatic coating solvent(s) and water are removed by evaporation which may proceed at room temperature or at elevated temperature, e.g. in the range of 40° to 140° C.

After drying the thickness of a suitable antistatic layer prepared from a coating composition according to the present invention is e.g. from 0.05 to 50 μm, depending on the desired conductivity and transparency of the antistatic coating.

For use in photographic silver halide emulsion layer film materials designated for projection purposes the optical density of the antistatic layer is preferably not more than 0.02 measured in the light range of 360 to 630 nm by MACBETH TD 904 densitometer.

By the above defined antistatic layer it is possible to reduce the surface resistance of a resin sheet or web material to a value lower than $10^{10}$ ohm/Square at relative humidity (R.H.) of 30%.

The surface resistance expressed in ohm/square (ohm/sq.) of the above defined antistatic layer is measured according to test procedure A as follows:

after coating, the resulting antistatic layer or its assemblage with overlying layer(s) is dried and conditioned at a specific relative humidity (RH) and temperature. The surface resistance expressed in ohm per square (Ω/square) is performed by placing onto the outermost layer two conductive poles having a length of 10 cm parallel to each other at a distance of 1 cm and measuring the resistance built up between the electrodes with a precision ohm-meter (ref. DIN 53482).

According to test procedure B (described in the periodical Research Disclosure—June 1992, item 33840) the resistance of the layer assemblage is measured contactless by arranging it between capacitor plates making part of a RC-circuit differentiator network. The dimensions of the measurement cell are chosen in such a way that relying on the known capacitor value (C) it is possible to calculate from the measured RC-value the electrical resistance of the layer assemblage. Such proceeds by introducing an electrical pulse into the measurement circuit and recording the discharge curve which yields the time $\tau = R \times C$, wherein the applied charge and voltage of the electrical pulse have droppped to its 1/e value (e is the base number of the natural logarithms). Applying an alternating current voltage with frequency (f), considering the RC-circuit as a high frequency pass filter, it is possible to find the resistance by using the equation: $f = \frac{1}{2}\pi \times R \times C$ at the 3 dB point.

The discharge duration to the value 1/e of the original voltage and charge in the series resistance (R) and capacitor (C) circuit is expressed in milliseconds (msec). The lower that value the better the antistatic character or charge mobility of the applied antistatic layer.

An important use of the above defined antistatic layer composition is in the manufacture of photographic silver halide emulsion materials having a hydrophobic resin support or hydrophobic resin coated paper support.

Hydrophobic resin supports useful in the manufacture of photographic silver halide emulsion materials are well known to those skilled in the art and are made e.g. of polyester, polystyrene, polyvinyl chloride or polycarbonate, preference being given to polyethylene terephthalate. A preferred resin coated paper support is a poly-Alpha-olefin coated paper support such as a polyethylene coated paper support.

The hydrophobic resin support may be provided with one or more subbing layers for improving thereto the adherence of the defined antistatic layer. Suitable subbing layers for polyethylene terephthalate supports are described e.g. in GB-P 1,234,755, U.S. Pat. No. 3,397,988; 3,649,336; 4,123,278 and U.S. Pat. No. 4,478,907 which relates to subbing layers applied from aqueous dispersion of sulfonated copolyesters, and further the subbing layers decribed in Research Disclosure published in Product Licensing Index, July 1967, p. 6.

A photographic silver halide emulsion material containing according to the present invention an outermost antistatic layer may contain any kind of silver halide emulsion layer known to those skilled in the art. For example, these materials may contain a silver halide emulsion layer of the type used in continuous tone or halftone photography, microphotography and radiography. The defined antistatic layer can be used advantageously in black-and-white or colour photographic materials and likewise in silver halide emulsion layers intended for use in the silver complex diffusion transfer reversal (DTR) process as well as in a dye diffusion transfer process operating with silver halide emulsion layers.

For the composition of silver halide emulsion layers reference is made e.g. to Research Disclosure 17,643 of December 1978 and Research Disclosure 307,105 of November 1989.

Apart from its use in photographic silver halide emulsion materials the antistatic layer may be used in non-photosensitive recording materials serving as image-receiving material in the silver complex diffusion transfer process as described e.g. in the book "Photographic Silver Halide Diffusion Processes" by André Rott and Edith Weyde—The Focal Press London and New York (1972) or in a dye diffusion transfer process as described e.g. by C. Van de Sands in Angew. Chem. Int. Ed. Engl. 22, (1983) p. 191–209.

By using a photographic silver halide emulsion layer material having an antistatic layer as defined above, problems caused by static charges can be avoided or substantially reduced. For example, the formation of static charges by contact of a silver halide emulsion layer face with the rear side of the recording material or caused by friction with substances such as rubber and hydrophobic polymeric binder, e.g. the binder constituent of phosphor screens used as X-ray intensifying screens, can be markedly reduced by employing said antistatic layer as an outermost layer. The build up of static charges and subsequent dust attraction and/or sparking, e.g. during loading of films in cassettes, e.g. X-ray cassettes, or transport in Cameras, e.g. micro-film cameras, and projectors, can be avoided.

Although the above defined antistatic layer is particularly useful in reducing the surface resistance of photographic silver halide emulsion materials it is likewise useful in reducing surface resistance of photographic materials based on diazo-type compositions, vesicular-image forming materials, magnetic recording materials, electrographic or electrophotographic recording materials, mounting or drafting film, synthetic yarns and fibers and molded plastic materials.

The following examples illustrate the present invention without however limiting it thereto.

All percentages, parts and ratios are by weight unless otherwise mentioned.

EXAMPLES 1 to 7

(I) Preparation of 3,4-ethylenedioxy-thiophene

The 3,4-disubstituted thiophenes of the above general formula (II) can be obtained by processes known in principle by reacting the alkali metal salts of 3,4-dihydroxy-thiophene-2,5-dicarboxylic esters with the appropriate alkylene vic-dihalides and subsequently decarboxylating the free 3,4-(alkylene-vic-dioxy)thiophene-2,5-dicarboxylic acids (see, for example, Tetrahedron (1967) Vol. 23, 2437–2441 and J. Am. Chem. Soc. 67 (1945) 2217–2218).

(II) Preparation of poly (3,4-ethylenedioxy-thiophene) dispersion called hereinafter dispersion (PT)

a) Into 1000 ml of an aqueous solution of 20 g of polystyrene sulfonic acid (109 mmol of $SO_3H$ groups) with number-average molecular weight (Mn) 40,000, were introduced 12.9 g of potassium peroxidisulfate ($K_2S_2O_8$), 0.1 g of $Fe_2(SO_4)_3$ and 5.6 g of 3,4-ethylenedioxy-thiophene. The thus obtained reaction mixture was stirred for 24 h at 20° C. and subjected to desalting.

b) 500 ml of the above prepared reaction mixture were diluted with 500 ml of water and stirred for 6 hours at room temperature in the presence of a granulated weak basic ion exchange resin LEWATIT H 600 (tradename) and strongly acidic ion exchanger LEWATIT S 100 (tradename). After said treatment the ion exchange resins were filtered off and the potassium ion and sulfate ion content were measured which were respectively 0.4 g $K^+$ and 0.1 g $(SO_4)^{2-}$ per liter.

(III) Preparation of latices A, B and C

Latex A

A mixture of 360 ml of 10% aqueous solution of HOSTAPAL B [tradename of Hoechst Aktiengesellschaft, Frankfurt, Germany for nonyl-phenyl (oxyethylene)$_5$—O—$SO_3Na$] and 5940 ml of water was heated to 85° C. while nitrogen gas was bubbled through. 383 ml of methyl methacrylate and 225 ml of a 1% aqueous solution of $K_2S_2O_8$ were added and the reaction mixture was stirred for 30 minutes. Thereupon an additional amount of 1532 ml of methyl methacrylate and 450 ml of 1% aqueous solution of $K_2S_2O_8$ were added dropwise and stirring was continued for a further 2 h at 85° C.

The solids content of the latex was 20.9% and the average particle size of the latex particles being dispersed polymethyl methacrylate particles was 69 nm. The glass transition temperature (Tg) of the obtained polymethyl methacrylate was: 119° C.

Latex B

A mixture of 36 ml of 10% aqueous solution of HOSTAPAL B (tradename) and 1314 ml of water was heated to 85° C. while nitrogen gas was bubbled through. 77 ml of methyl methacrylate and 22.5 ml of a 2% aqueous solution of $K_2S_2O_8$ were added and the reaction mixture was stirred for 30 minutes. Thereupon an additional amount of 306 ml of methyl methacrylate and 45 ml of 2% aqueous solution of $K_2S_2O_8$ were added simultaneously and dropwise over a period of 30 minutes. Then stirring of the reaction mixture was continued for 2 h at 85° C.

The solids content of the latex was 20.2% and the average particle size of the dispersed polymethyl methacrylate particles was 88.8 nm.

The glass transition temperature (Tg) of the obtained polymethyl methacrylate was: 122° C.

Latex C

A mixture of 360 ml of 10% aqueous solution of HOSTAPAL B (tradename) and 5940 ml of water was heated to 85° C. while nitrogen gas was bubbled through. 329 ml of a mixture of monomers methyl methacrylate and butyl acrylate in a 65/35 ratio and 225 ml of a 2% aqueous solution of $K_2S_2O_8$ were added and the reaction mixture was stirred for 30 minutes. Thereupon an additional amount of 1557 ml of said mixture of monomers and 450 ml of 2% aqueous solution of $K_2S_2O_8$ were added simultaneously and dropwise over a period of 30 minutes. Subsequently 225 ml of said aqueous solution of $K_2S_2O_8$ were added and stirring continued for a further 2 h at 85° C.

The solids content of the latex was 20.9% and the average particle size of the latex particles was 76.4 nm. The Tg of the obtained copolymer was 49° C.

(IV) Preparation of coating compositions

Using the above defined latices A, B and C and poly(3,4-ethylenedioxy-thiophene) dispersion (PT) of preparation (II) in admixture with N-methyl-2-pyrrolidinone and water in amounts expressed in ml as indicated in the following Table 1 test coating compositions 1 to 7 were prepared.

TABLE 1

| Composition No. | Latex A ml | Latex C ml | Dispersion PT ml | NMP ml | $H_2O$ ml |
|---|---|---|---|---|---|
| 1 | 0 | 0 | 31 | 0 | 369.0 |
| 2 | 7.7 | 0 | 31 | 16 | 345.0 |
| 3 | 17.2 | 0 | 31 | 16 | 335.5 |
| 4 | 26.8 | 0 | 31 | 16 | 325.9 |
| 5 | 36.4 | 0 | 31 | 16 | 316.3 |
| 6 | 46.0 | 0 | 31 | 16 | 306.7 |
| 7 | 0 | 26.0 | 31 | 0 | 343.0 |

To each of the above compositions, except for composition 1, was added 0.5 ml of a 5.71% aqueous dispersion of a matting agent MA in the form of crosslinked polymethyl metacrylate particles having an average particle size of 1.3 μm (ref. published European patent application No. 0 466 982).

(V) Coating procedure

A longitudinally stretched polyethylene terephthalate support having before stretching a thickness of 0.34 mm and thereupon a thickness of 0.1 mm was subbed with a terpolymer latex of vinylidene chloride/methyl acrylate/itaconic acid (88/10/2) in admixture with colloidal silica (surface area 100 m²/g). After stretching in the transverse direction the coverages of said terpolymer and of said silica in said subbing layer were 170 mg/m² and 40 mg/m² respectively.

Each of said coating compositions 1 to 7 was coated separately onto the subbing layer of said polyethylene terephthalate support. Coating proceeded at a wet coverage of 50 m²/l. The obtained outermost antistatic layers 1 to 7 were dried at 120° C.

The resistance against damage in a contact-and-peel-apart test was determined after treatment for 3 days at 57° C. at 85% relative humidity in pressure contact (0.05 kg/m²) with a normally hardened gelatin-silver halide emulsion layer of a microfilm type recording material. The damage is expressed in percentage (% S) of damaged surface of the peeled apart antistatic layer (see Table 2 hereinafter). Therefrom may be concluded that the addition of the mentioned amounts of hydrophobic latex polymer to the poly(3,4-ethylenedioxythiophene) dispersion (PT) prevents sticking of the coated antistatic layer at high relative humidity to a normally hardened gelatin-silver halide emulsion layer whereas the absence thereof leads to damage over the whole contacting surface.

No damage was detected when the contact-and-peel-apart test was carried out at relative humidity (RH) of only 30%.

The adherence of the above defined outermost antistatic layers to the subbed polyester support was tested in dry state and after pre-wetting by immersion for 10 minutes in water of 38° C.

On carrying out the adherence test in dry state, a pressure-adhesive tape was pressed by finger-force onto a non-wetted material and thereupon teared off abruptly. On carrying out the adherence test in wet state the pre-wetted material was strongly rubbed 5 times with a sponge.

The adherence test in wet state resulted in a total removal of the antistatic layer when not containing the defined latex polymer. With the indicated amounts of latex polymer excellent adherence of the antistatic layer to the subbed polyester support has been obtained.

The adherence test in dry state proved that there was good adherence for the antistatic layers with and without the defined latex polymer.

Before measuring surface resistivity and discharging time the above defined outermost antistatic layers were conditioned for 24 h at 20° C. and 30% relative humidity.

TABLE 2

| Layer No. | Surface resistivity ohm/square | Discharging time msec | Damage % S |
|---|---|---|---|
| 1 | $1.4 \times 10^8$ | 0.11 | 100 |
| 2 | $5 \times 10^7$ | 0.00079 | 50 |

TABLE 2-continued

| Layer No. | Surface resistivity ohm/square | Discharging time msec | Damage % S |
|---|---|---|---|
| 3 | $5 \times 10^7$ | 0.00058 | 0 |
| 4 | $8.3 \times 10^7$ | 0.0012 | 0 |
| 5 | $6.7 \times 10^{10}$ | 0.40 | 0 |
| 6 | $1.8 \times 10^9$ | 0.045 | 0 |
| 7 | $4.9 \times 10^9$ | 0.051 | 0 |

EXAMPLES 8 to 10

The preparation of the following antistatic coating compositions proceeded analogously to the preparations described in Examples 1 to 7 but using the coating ingredients in the amounts defined in the following Table 3.

TABLE 3

| Composition No. | Latex B ml | KELZAN S gram | Dispersion PT ml | NMP ml | $H_2O$ ml |
|---|---|---|---|---|---|
| 8 | 43 | 0.15 | 48 | 20 | 888 |
| 9 | 43 | 0.15 | 48 | 30 | 878 |
| 10 | 43 | 0.15 | 48 | 40 | 868 |

KELZAN is a registered trademark of Merck & Co., Kelco Division, U.S.A. KELZAN S is according to Technical Bulletin DB-19 Of Kelco Division "xanthan gum" which is a polysaccharide containing mannose, glucose and glucuronic acid repeating units (as a mixed potassium, sodium and calcium salt).

To each of the above compositions 8, 9 and 10 0.53 ml of a matting agent dispersion MA as described in Examples 1 to 7 was added.

Each of the defined compositions was coated at 30 m²/l and dried as described for the compositions of Examples 1 to 7. The measurements of surface resistivity (SR in ohm/square) and charge mobility (represented by discharging time τ=RC in msec) of the obtained antistatic layers were carried out before (BP) and after (AP) a wet processing common for developing and fixing exposed photographic silver halide emulsion materials using an alkaline developer (pH=11), an acidic thiosulphate fixing liquid (pH=4.5), and tap water as rinsing liquid. Before effecting the described measurements the non-processed samples and processed samples were conditioned at 20° C. and 30% relative humidity.

The results are listed in the following Table 4.

TABLE 4

| Layer No. | Before processing | | After processing | |
|---|---|---|---|---|
| | SR | τ | SR | τ |
| 8 | $1.7 \times 10^8$ | 0.049 | $2.3 \times 10^9$ | 0.13 |
| 9 | $6.3 \times 10^8$ | 0.23 | $6.2 \times 10^9$ | 3.4 |
| 10 | $1.1 \times 10^9$ | 0.36 | $1.4 \times 10^9$ | 0.86 |

The results in Table 4 prove that the antistatic properties of the applied outermost antistatic layer are almost the same before and after wet processing, so that so-called permanent antistatic character has been obtained.

EXAMPLE 11

Onto the subbed support of Example 1 at the side opposite the outermost antistatic layer a gelatin-silver bromide-iodide emulsion [AgBr/AgI (99/1 mole %] was coated at a coverage of silver halide equivalent with 2.06 g of silver nitrate per m2. The gelatin to silver halide ratio was 1.5, the silver halide being expressed as an equivalent amount of silver nitrate. The average grain size of the silver halide was 0.35 μM.

The antistatic properties of the thus obtained photographic material were fully satisfactory from the viewpoint of the absence of dust attraction on friction before and after wet processing.

We claim:

1. A sheet or web material comprising a hydrophobic resin support or paper support coated with at least one hydrophobic resin layer wherein said resin support or resin layer is coated with an outermost antistatic layer containing as an essential component a polythiophene with conjugated polymer backbone in the presence of a polymeric polyanion compound, wherein said antistatic layer contains also a hydrophobic organic polymer having a glass transition value (Tg) of at least 40° C., said polythiophene being present at a coverage of at least 0.001 g/m² and the weight ratio of said polythiophene to said hydrophobic organic polymer being in the range of 1/10 to 1/1000.

2. Sheet or web material according to claim 1, wherein said hydrophobic organic polymer is present at a coverage in the range of 0.05 to 5.00 g/m².

3. Sheet or web material according to claim 1, wherein the weight ratio of polythiophene polymer to polymeric polyanion compound is from 50/50 to 15/85.

4. Sheet or web material according to claim 1, wherein in said polythiophene thiophene nuclei are substituted with at least one alkoxy group, or —O(CH$_2$CH$_2$O)$_n$CH$_3$ group, n being 1 to 4, or thiophene nuclei are ring closed over two oxygen atoms with an alkylene group including such group in substituted form.

5. Sheet or web material according to claim 1, wherein said polythiophene has structural units corresponding to the following general formula (I):

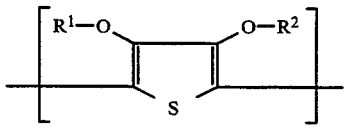

in which:

each of R$^1$ and R$^2$ independently represents hydrogen or a C$_{1-4}$ alkyl group or together represent an optionally substituted C$_{1-4}$ alkylene group.

6. Sheet or web material according to claim 1, wherein said polythiophene has been prepared in the presence of said polymeric polyanion compound by oxidative polymerization of 3,4-dialkoxythiophenes or 3,4-alkylenedioxythiophenes according to the following general formula (II):

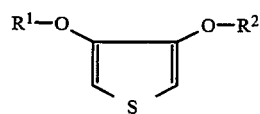

in which:

each of R$^1$ and R$^2$ independently represents hydrogen or a C$_{1-4}$ alkyl group or together represent an optionally substituted C$_{1-4}$ alkylene group.

7. Sheet or web material according to claim 1, wherein said polymeric polyanion compound is a polymeric carboxylic acid or polymeric sulfonic acid or such acid in neutralized form.

8. Sheet or web material according to claim 1, wherein said hydrophobic organic polymer is a homopolymer or copolymer made of polymerizable monomers selected from the group consisting of styrene, vinylidene chloride, vinyl chloride, an alkyl acrylate, and an alkyl methacrylate or wherein said hydrophobic organic polymer is a polyester, a copolyester, an urethane acrylate, acrylamide or a polyether including mixtures thereof.

9. Sheet or web material according to claim 1, wherein said antistatic layer has been coated from an aqueous dispersion of said hydrophobic organic polymer in the presence of an organic solvent or swelling agent for said hydrophobic organic polymer.

10. Sheet or web material according to claim 1, wherein said antistatic layer contains also at least one member selected from the group consisting of matting agents, friction lowering substances, fluor-substituted organic surface active agents, and spacing agents.

11. Sheet or web material according to claim 1, wherein said water resistant resin support is a polyethylene terephthalate support.

* * * * *